(12) United States Patent
Hayday

(10) Patent No.: US 6,350,287 B1
(45) Date of Patent: Feb. 26, 2002

(54) BIODEGRADABLE ETHER DRY CLEANING SOLVENT

(75) Inventor: William A. Hayday, Woodbury, NY (US)

(73) Assignee: Rynex Holdings, Ltd., Hamilton (BM)

( * ) Notice: Subject to any disclaimer, the term of this patent is extended or adjusted under 35 U.S.C. 154(b) by 0 days.

(21) Appl. No.: 09/874,136

(22) Filed: Jun. 5, 2001

Related U.S. Application Data

(60) Division of application No. 09/621,896, filed on Jul. 20, 2000, now Pat. No. 6,273,919, which is a continuation-in-part of application No. 09/402,412, filed on Jan. 12, 2000, now Pat. No. 6,156,074, which is a continuation-in-part of application No. 08/833,341, filed as application No. PCT/US98/06811 on Apr. 6, 1998, now Pat. No. 5,888,250.

(60) Provisional application No. 60/211,301, filed on Jun. 13, 2000.

(51) Int. Cl.$^7$ .................................................. D06L 1/04
(52) U.S. Cl. ............................ 8/142; 510/516; 510/527
(58) Field of Search ................................ 510/516, 527; 8/142

(56) References Cited

U.S. PATENT DOCUMENTS

| | | | | |
|---|---|---|---|---|
| 4,648,884 A | * | 3/1987 | Koci et al. ...................... | 8/527 |
| 4,769,172 A | * | 9/1988 | Siklosi ........................ | 252/153 |
| 4,889,652 A | * | 12/1989 | Sullivan et al. ................ | 252/99 |
| 4,943,392 A | * | 7/1990 | Hastedt et al. ............... | 252/539 |
| 5,348,679 A | * | 9/1994 | Weinhold et al. ............ | 252/105 |
| 5,525,245 A | * | 6/1996 | Grandmaire et al. ......... | 252/8.8 |
| 5,547,476 A | * | 8/1996 | Siklosi et al. ................... | 8/142 |
| 5,656,585 A | * | 8/1997 | Grandmaire et al. ........ | 510/524 |
| 5,840,675 A | * | 11/1998 | Yeazell ........................ | 510/439 |
| 5,888,250 A | * | 3/1999 | Hayday et al. ................. | 8/142 |
| 5,891,197 A | * | 4/1999 | Young et al. ................... | 8/137 |
| 5,942,007 A | * | 8/1999 | Berndt et al. ................... | 8/142 |
| 5,997,586 A | * | 12/1999 | Smith et al. .................... | 8/142 |
| 6,273,919 B1 | * | 8/2001 | Hayday ......................... | 8/142 |

FOREIGN PATENT DOCUMENTS

| | | |
|---|---|---|
| WO | WO 93/25654 | * 12/1993 |
| WO | WO 94/09108 | * 4/1994 |

* cited by examiner

*Primary Examiner*—John Hardee
(74) *Attorney, Agent, or Firm*—Synnestvedt & Lechner LLP

(57) ABSTRACT

A method for dry-cleaning garments which comprises treating the garments with a mixture of dipropylene glycol tertiary-butyl ether (DPTB) and water for a period of time sufficient to effect dry-cleaning, wherein the weight ratio of DPTB to water is at least 9:1.

3 Claims, No Drawings

BIODEGRADABLE ETHER DRY CLEANING SOLVENT

CROSS REFERENCE TO RELATED APPLICATIONS

The present application is a divisional of U.S. patent application Ser. No. 09/621,896 filed Jul. 20, 2000 now U.S. Pat. No. 6,273,919, which claims priority benefit of U.S. Provisional Patent Application No. 60/211,301 filed Jun. 13, 2000, the disclosures of which are incorporated herein by reference. In addition, U.S. patent application Ser. No. 09/621,896 is a continuation-in-part of U.S. patent application Ser. No. 09/402,412 filed Jan. 12, 2000, now U.S. Pat. No. 6,156,074, which application, in turn, is a §371 of PCT/US98/06811 filed Apr. 6, 1998, which, in turn, is a continuation-in-part of U.S. patent application Ser. No. 08/833,341 filed Apr. 4, 1997, now U.S. Pat. No. 5,888,250, the disclosures of all of which are also incorporated herein by reference.

BACKGROUND OF THE INVENTION

The present invention relates to a novel glycol ether dry-cleaning solvent and a method for effecting dry-cleaning using said solvent. More particularly, the present invention relates to a glycol ether solvent that not only is comparable or superior to perchloroethylene in its attributes and benefits, and does not suffer from the serious environmental, health and occupational negatives and problems associated with the use of perchloroethylene, but which also represents an improvement over the current glycol ether solvents that are contemplated as replacements for perchloroethylene.

Perchloroethylene is the most widely used dry-cleaning solvent, and is commonly referred to (and will be referred to sometimes hereinafter) as "perc". Perc is a chlorinated hydrocarbon-based solvent. It is the dry-cleaning solvent of choice throughout North America, Europe and Asia.

In addition to perc's use in the dry-cleaning industry, it has found extensive use as a degreasing agent in the metals industry, in the scouring/milling of wool, and in various "clean room" applications in the semiconductor and electronics industries. The industrial uses of perc are approximately ten-fold greater than its use as a solvent for dry cleaning.

While perc has been found to be an effective dry-cleaning agent because it is non-flammable, does not damage synthetic fabrics or cause shrinkage to fabrics containing naturally occurring fibers, such as wool, and has a relatively low boiling point that permits its being reclaimed and purified by means of ordinary distillation, it does present a number of other problems which present drawbacks to its use. In particular, perchloroethylene presents a number of health and environmental hazards that would militate against its continued use, provided a substitute solvent of comparable quality were available that was free of the aforementioned hazards.

Because perc is heavier than water, its disposal represents a significant environmental risk because it will sink to the bottom of an aquifer, lake, river, and the like, with possibly resultant contamination of the water supply. Additionally, perc vapors have been implicated as having a deleterious effect on the central nervous system. In addition, because it is a highly chlorinated molecule, perc has been identified as being a significant health hazard to cattle, and as a cause of skin cancer, particularly melanoma, because of the action of the chlorine in perc depleting oxygen from the ozone layer. Furthermore, and of particular import, is the fact that perc is not biodegradable and, hence, will over a period of time accumulate, presenting a significant industrial waste disposal hazard.

As the nature and seriousness of the foregoing problems become more and more manifest with the passage of time and with the completion of various research and clinical investigations into the nature of perc and its mechanisms of action, the use of alternative solvents has been sought, but none have met with any degree of commercial success since they could not match the result obtained by perc as a dry-cleaning agent.

However, at this point in time, when environmental concerns are being rigorously monitored and policed by domestic and foreign governments by means of legislation and civil and even criminal prosecution, the need for a substitute solvent for perc for dry-cleaning operations, as well as other operations, has become a matter of some degree of urgency.

A difficulty in identifying a replacement dry-cleaning solvent for perc is that it must meet so many requirements, both as to its efficacy as a dry-cleaning agent, i.e. high purity, non-shrinking with respect to about 160 types of fabric, dye-fast for non-bleeding with respect to about 900 types of dyes, a high flashpoint to render it non-flammable and non-combustible, the ability to separate from water, effective detergency, ease of distillation, simplicity of reclamation, compatibility with existing dry-cleaning equipment, and the like, as well as its being non-polluting to the water supply and the ozone layer, biodegradable, non-toxic, non-carcinogenic, and the like.

One proposed solvent substitute, namely propylene glycol monomethyl ether, which is disclosed in EP479,146 as possessing many desirable properties, was found to be wanting in that it causes damage to weak dyes, fine yarns, and delicate fabrics, such as acetates, because of its pronounced tendency to accumulate water from the environment, and from fabrics being dry-cleaned. Water accumulation or water-miscibility is also a decided negative from another aspect in that it significantly impairs the efficiency of the dry-cleaning process because the dry-cleaning equipment is burdened with the handling of excessive quantities of water and the solvent stock is diluted and must be brought back to a correct ratio for stability reasons.

Propylene glycol tertiary-butyl ether (PTB) and propylene glycol n-butyl ether (PNB) were disclosed by WO 98/45523 as being superior alternatives to propylene glycol monomethyl ether. PTB and PNB were disclosed to possess all of the dry-cleaning attributes associated with perc and none of its drawbacks. The water-absorbing capabilities of both solvents was disclosed to be within a range effective in preventing damage to acetates and the tendency of woolen garments to shrink in water. The water absorption also lowered the solvent boiling point while raising the flashpoint. Both solvents were also disclosed to be non-pollutants of the water supply and ozone layer, biodegradable, non-toxic and non-carcinogenic. In addition, both solvents were capable of being used in existing perc dry-cleaning equipment.

Aqueous PTB and PNB dry-cleaning compositions have flashpoints within industry standards. However, there has recently been a regulatory trend toward a higher flashpoint standard. Furthermore, regulatory agencies are also considering making the standard applicable to individual components of a composition, even if the flashpoint of the overall composition meets industry standards. Accordingly, there exists a need for dry-cleaning compositions based on higher flashpoint glycol ethers.

The conventional wisdom has been, however, that higher flashpoint glycol ethers make poor dry cleaning solvents because they are too incompatible with water. While glycol ether dry-cleaning solutions containing too much water are undesirable because of the consequential shrinkage to woolens and damage to acetates, not to mention the solvent dilution, a low water content hampers the ability of the dry cleaning composition to remove water-soluble stains, which make up the bulk of stains to be removed from garments requiring dry cleaning. Thus, the need for dry-cleaning compositions based on higher flashpoint glycol ethers remains unsatisfied.

SUMMARY OF THE INVENTION

This need is met by the present invention.

In line with the foregoing, it is an object of the present invention to provide a solvent which possesses comparable, if not superior chemical and physical properties when compared to perc in dry cleaning, the cleaning of scoured and mill wool, and the dying of fabrics, while, simultaneously, protecting the environment, public health and safety from the many known negatives associated with the use of perc.

It is a further object of the present invention to provide a solvent which possesses comparable, if not superior chemical and physical properties when compared to lower flashpoint glycol ethers when used in such end-use applications.

It is a further object of the present invention to provide a dry-cleaning solvent that has a specific gravity less than that of water.

It is still a further object of the present invention to provide a dry-cleaning solvent that minimizes or eliminates the shrinkage of woolen garments, prevents or limits the bleeding of dyes, and which is able to treat acetates, silks, virgin wool and other delicate fabrics gently so as to avoid damage.

It is still another object of the present invention to provide a solvent for dry-cleaning, fabric dying and the cleaning of scoured and milled wool, the individual components of which have flashpoints within industry standards, yet at the same time has a sufficiently low boiling point to allow the solvent to be reclaimed and purified via conventional distillation processes.

It is still yet another object of the present invention to provide a dye solution containing dyes that are not water-soluble and a solvent that minimizes or eliminates the shrinkage of woolen fabrics and does not damage acetates, silks, virgin wools and other delicate fabrics, yet penetrate the fabric fiber sufficiently to form a strong dye bond to fabric fibers.

It has now been discovered that dipropylene glycol tertiary butyl ether (DPTB) has a flashpoint far above current industry standards, yet at the same time possesses a degree of solvency for water-soluble stains that is at least equivalent to, and in most cases better than, perc and the other glycol ether dry cleaning solvents presently in commercial use. Furthermore, this degree of solvency increases as water is added to DPTB up to the maximum quantity soluble in the solvent at room temperature, typically about 10% by weight of the total composition.

Therefore, according to one embodiment of the present invention, a dry-cleaning composition is provided containing dipropylene glycol tertiary-butyl ether (DPTB), water and a fabric softening agent in an amount effective to soften the fabric of garments cleaned with the dry-cleaning composition, wherein the weight ratio of DPTB to water is at least about 9:1.

DPTB absorbs water under ambient conditions to the point of saturation, some of which is bound as an azeotrope. Therefore, commercial grades of DPTB unavoidably contain some water. Preferred dry cleaning compositions according to the present invention contain about 90% by weight of DPTB and about 10% by weight of water.

The ability of DPTB to absorb water increases as the temperature of the composition increases, so that even compositions that are moisture saturated at room temperature will absorb water from garments when heated during the dry cleaning process. The dry cleaning compositions of the present invention will thus absorb water from the garments being dry cleaned. The water is then separated from the solvent by azeotropic distillation, with the recovery of essentially pure DPTB with an azeotropic level of water.

Therefore, the present invention also includes a method for dry-cleaning garments using the dry-cleaning compositions of the present invention. Methods in accordance with this embodiment of the present invention treat the garments with a composition containing dipropylene glycol tertiary-butyl ether (DPTB) and water for a period of time sufficient to effect dry-cleaning, wherein the weight ratio of DPTB to water is at least about 9:1.

The compositions of the present invention can also be used to clean, scour and mill wool. Methods in accordance with this embodiment of the present invention treat the scoured and milled wool with a composition containing dipropylene glycol tertiary-butyl ether (DPTB) and water for a period of time sufficient to effect cleaning, wherein the weight ratio of DPTB to water is at least about 9:1.

The compositions of the present invention can also be used for wool scouring and milling processes as well. In accordance with this embodiment of the present invention, a method of scouring wool is provided characterized by scouring the wool with the compositions of the present invention containing dipropylene glycol tertiary-butyl ether (DPTB) and water, wherein the weight ratio of DPTB to water is at least about 9:1. The solvent compositions of the present invention cleanly dissolve the lanolin contained in the raw wool for subsequent recovery and purification for use as an ingredient in cosmetics and other products.

According to another embodiment of the present invention, a method is provided for milling wool, characterized by milling the wool with a composition containing dipropylene glycol tertiary-butyl ether (DPTB) and water, wherein the weight ratio of DPTB to water is at least about 9:1.

The present invention further incorporates the discovery that water-insoluble dyes that are soluble in aliphatic glycol ethers are soluble in the compositions of the present invention to provide compositions that may be used to dye non-woolen fabrics with significantly improved colorfastness. The drying times of fabrics dyed with the dye compositions of the present invention significantly decreased as well, yet at the same time, a stronger bond between the dye molecules and the fabric fibers is formed.

Therefore, according to another aspect of the present invention, a composition for dyeing fabrics is provided that is a solution of a water-insoluble aliphatic glycol ether-soluble dye dissolved in a solvent containing dipropylene glycol tertiary-butyl ether (DPTB) and water, wherein the weight ratio of DPTB to water is at least about 9:1.

According to another embodiment of the present invention, a method is provided for dyeing fabric with the dye compositions of the present invention. Methods in accordance with this aspect of the present invention treat the fabric for a period of time sufficient to effect dyeing with a dye composition containing a solution of a water-insoluble aliphatic glycol ether soluble dye dissolved in a solvent containing dipropylene glycol tertiary-butyl ether (DPTB) and water, wherein the weight ratio of DPTB to water is at least about 9:1. Methods in accordance with the present invention further include the step of drying the fabric after the step of treating the fabric to effect dyeing is completed.

The compositions of the present invention were discovered to present several unexpected properties in comparison to perc and commercial glycol ether compositions. Fabrics that were cleaned or dyed, and raw wool that was milled, scoured or cleaned, with the compositions of the present invention had virtually no residual odor, unlike raw wool and fabrics processed with perc or other commercial glycol ether compositions. What odor that was detectable was pleasant. In addition, the odor of DPTB could not be "reactivated" with water, meaning that virtually no residual solvent remained in the fabric. This is in contrast to garments cleaned with perc or other commercial glycol ethers, which produce a strong solvent odor if subsequently contacted with water.

In addition, fabric that was dry-cleaned or dyed with the compositions of the present invention dried virtually wrinkle-free with a noticeably soft hand, particularly in comparison to fabrics that were similarly treated with perc, or other commercial glycol ether compositions. Thus, fabrics cleaned or dyed with the compositions of the present invention require significantly less ironing or other processing to remove wrinkles in fabrics cleaned or dyed with perc or other glycol ethers, and at the same time feel softer. This is a significant commercial advantage for dry-cleaning establishments.

Other features of the present invention will be pointed out in the following description and claims, which disclose the principles of the invention and the best modes which are presently contemplated for carrying them out.

DETAILED DESCRIPTION OF THE PREFERRED EMBODIMENTS

It has been found that when dipropylene glycol tertiary-butyl ether (DPTB) is used in the dry-cleaning of garments, the solvent possesses all of the attributes associated with perchloroethylene and none of its drawbacks. Furthermore, DPTB also has certain significant advantages not possessed by perchlorethylene. The DPTB compositions of the present invention are non-flammable, non-combustible, non-carcinogenic, non-toxic and, of the utmost import, biodegradable. The compositions weigh less than water, i.e., the specific gravity is less than that of water.

Advantageously, the flashpoint of DPTB is higher than that of other glycol ethers used as dry-cleaning solvents. The DPTB compositions of the present inventions have even higher flashpoints. Yet the solvent can still be reclaimed and purified via conventional distillation processes, including vacuum distallation, and despite having a higher flashpoint, the solvent is still effective in the removal of water-soluble stains.

DPTB has been discovered to be sufficiently water-compatible to absorb water from garments being dry-cleaned, so that the water component is effectively tied-up, thus avoiding the tendency of woolen garments to shrink, while simultaneously preventing damage to acetates.

It has also been determined that solutions of DPTB and water are effective in the cleaning of scoured and milled raw wool, as well as in the scouring of raw wool, which involves the pulling of oils and fatty acids, e.g. lanolin, from the wool and in the milling of yarns formed therefrom. Such scouring and milling operations are conducted in dry-cleaning machinery employing otherwise conventional scouring and milling techniques.

A particular advantage of the DPTB-water solutions of the present invention in dry-cleaning is that they do not behave like a typical mixture, but rather, the behavior is the same as a single substance. This permits a better defined separation upon azeotropic distillation at a lower boiling point and also facilitates reclamation more effectively, at a level of 99% or greater, and also enhances purification using conventional distillation techniques.

Of particular note, from an economic as well as an operational standpoint, is the ability of DPTB to separate from water by azeotropic distillation. This is of particular significance in dry-cleaning because garments entering a dry-cleaning plant contain water in the form of moisture. As noted above, if water were not absorbed by DPTB, damage to woolen and acetate garments would occur. If the absorbed water could not then be separated from the DPTB by azeotropic distillation, the solvent would be diluted with free water and, thus, the dry cleaning process, and its efficiency, would be seriously compromised, as would the reclaimability of the DPTB.

Furthermore, DPTB out-performs both PTB and PNB from the perspective of having an optimum combination of elevated flashpoint and water retention. This combination prevents the bleeding of the most fugitive dyes. Yet, the degree of moisture retention has surprisingly been found to be more than adequate to complete the cleaning process, but well below levels that promote the shrinkage of woolen garments. Additionally, the limited degree of miscibility avoids dilution of the solvent stock with its dependent problems, which are not inconsiderable when one considers the need to replenish the solvent.

DPTB is a very effective dry-cleaning solvent because its detergency action breaks down solvent-soluble (water-insoluble) stain, which account for 15% of all stains found in garments and which are caused by fatty acids. The detergency of the solvent occurs by lifting the soiled area from a surface and by displacing it with surface active materials that have a greater affinity for the surface than they do for the soiled area. Yet at the same time, DPTB also deals most effectively with water-soluble stains, which account for more than 80% of stains encountered in dry-cleaning, such as, for example, stains from fruit, blood, urine, sweat, etc. Despite this affinity for water-soluble materials, DPTB has been found to be most effective in limiting the bleeding of dyes and avoiding the shrinkage of man-made polymers, such as acetates. In comparison to other glycol ethers such as PTB and PNB, the PTB exhibits an unexpectedly superior combination of detergency action toward solvent-soluble stains and affinity for water-soluble stains.

The DPTB compositions of the present invention dry at a relatively low temperature, namely, about 55° C. This is well within the drying requirements for fabrics constructed of fine yams so as to avoid damage thereto by excessive heat.

In preparing the compositions of the present invention, DPTB is combined with an amount of water up to the maximum quantity soluble in the DPTB at room temperature. Ambient conditions may already have resulted in the DPTB being saturated with water. If not, water may be added to the DPTB to obtain the desired weight ratio of solvent and water, i.e., but never less than about 9:1. Significantly, the quantity of DPTB can be maintained at this level without damage to acetate fabrics or increased bleeding of dyes. Even if the weight ratio of solvent to water approaches 9:1, DPTB is still an effective dry-cleaning solvent. Most preferred is the use of about 90% by weight of DPTB and about 10% by weight of water, which provides the best dry-cleaning result from the perspective of the removal of both solvent-soluble and water-soluble stains, combined with the most efficient and cost-effective dry-cleaning operation.

While DPTB can quite successfully and efficiently clean garments made of all types of textile fabrics without the need for additional agents, such as detergents and fabric softeners, it may be desirable to include in the formulation one or more surfactants to enhance the detergency action of the DPTB or PNB, by means of reducing the surface tension of the composition. Exemplary surfactant include fatty alcohol polyethylene glycol ethers, linear primary alcohol ethoxylates and cyclic siloxanes. Other glycol ethers suitable for use as dry-cleaning solvents may be added as well, including PTB and PNB. Thus, dry-cleaning compositions according to the present invention may include less than 90% by weight of DPTB, provided that the weight ratio of DPTB to water remains greater than about 9:1. Compositions according to the present invention may contain as little as 50% by weight of DPTB, or even less, or any quantity between 50% and 100% by weight, i.e., 55 weight %, 60 weight %, 65 weight %, etc.

While fabric softening agents are not necessary to achieve dry cleaning, they are beneficial and serve to enhance the dry cleaning process. Thus, compositions according to the present invention may also include an effective amount of one or more fabric softening agents.

It has also been determined that the DPTB compositions of the present invention are effective solvents for water-insoluble dyes and the dyeing of fabrics. Dye compositions can be prepared by dissolving aliphatic glycol ether-soluble dyes in the DPTB compositions of the present invention. Dyes that are water-insoluble but soluble in aliphatic glycol ethers can be readily identified by those of ordinary skill in the art without undue experimentation by performing simple solubility testing. Classes of water-insoluble dyes include basic or cationic dyes, dispersed dyes and vat dyes. Dye compositions are prepared by heating an effective amount of the dye with the DPTB composition of the present invention, with mixing until the dye is completely dissolved in the DPTB composition.

Fabric dying can be conducted using conventional dyeing equipment, or by using dry-cleaning machinery. The DPTB composition of the present invention as a solvent for the dye not only functions to dissolve the dye, it also promotes the penetration of the dye into the fabric fiber to form a stronger bond between the dye molecule and the fabric fiber.

After the dyeing is completed, the fabric is dried by essentially conventional techniques. Fabrics dyed with aliphatic glycol ether-soluble dyes dissolved in the DPTB compositions of the present invention exhibit faster drying times than fabrics dyed with water-based dyes. However, the greatest advantage is that the DPTB compositions of the present invention permit the use of water-insoluble dyes to dye fabrics that are colorfast when the dyed fabrics are subsequently washed in water.

EXAMPLES

The following examples are set forth to illustrate more clearly the principles and practice of the present invention. It is to be understood, of course, that the invention is not limited to the specific examples.

Example 1

One of the most significant properties that a dry-cleaning solvent should possess is limited fiber shrinkage to ensure that the fibers comprising the garment do not shrink excessively. Excessive shrinkage deforms the garment rendering it unsuitable for future wear. Accordingly, the dry cleaning solvent which is employed must not excessively shrink the component fibers which comprise the fabric of the garment. In contemporary usage, garments containing virgin wool and acetate, such as the lining found in men's jackets, can ill afford shrinkage beyond established norms.

A shrinkage test was conducted with respect to virgin wool by taking a series for of 4"×4" patterned virgin wool swatches and immersing then in separate containers containing each of the solvents set forth in Table I below. Approximately 10 minutes of mechanical action was applied to ensure that the wool fibers became totally saturated. The test swatch was then removed and dried at constant temperature not exceeding 55° C. The test swatch was then compared with a control material to identify any changes in the fibers to ensure that the patterns had not changed their dimensions.

Each of the test solvents was then analyzed to identify any fiber lost. The maximum shrinkage should not exceed 2% on the first immersion test and is usually expected to be less than 0.25% in any subsequent immersion test.

TABLE I

| Solvent | % Shrinkage on $1^{st}$ Immersion |
|---|---|
| PM (Propylene glycol methyl ether) | 2% |
| PNP (propylene glycol n-propylether) | 2% |
| DPM (dipropylene glycol methyl ether) | 2% |
| PERC (perchloroethylene) | 2% |
| PTB (propylene glycol tertiary-butyl ether) | 1/2% |
| DPTB (dipropylene glycol tertiary-butyl ether) | <1/2% |

Example 2

A shrinkage test conducted in Example 1 was repeated with 4"×4" swatches of acetate fabric. The results are set forth below in Table II, wherein it is evident from an examination of the results therein, and in Table I, that dipropylene glycol tertiary-butyl ether (DPTB) mixtures resulted in the smallest percentage of shrinkage in both virgin wool and acetate fabrics, and, in fact, reduced shrinkage by about 400% or greater compared with the other solvents, including perc, when employed with virgin wool, and an even greater percentage when employed with acetate fabrics.

TABLE II

| PM (propylene glycol methyl ether) | 3% |
|---|---|
| PNP (propylene glycol n-propyl ether) | 3% |
| DPM (dipropylene glycol methyl ether) | 2–5% |
| PERC (Perchloroethylene) | 2% |

TABLE II-continued

| | |
|---|---|
| PTB (propylene glycol tertiary-butyl ether) | 1/2% |
| DPTB (dipropylene glycol tertiary-butyl ether) | <1/2% |

Example 3

The bleeding of dyestuffs is the bane of the dry cleaner's existence. The variety of dyestuffs, their differing chemical structures, the degree to which they are soluble or insoluble in the particular dry cleaning solvent employed, and the like, present manifold problems which must be met, addressed and solved before a new dry cleaning solvent can be introduced successfully.

Dye bleeding tests were conducted by taking test swatches of virgin wool, 1 inch×1 inch, and immersing them in separate containers filled with each of the azeotropic solvent mixtures indicated in Table III below. Ball bearings were added to each of the containers to increase the impact of mechanical action on the dyes in an effort to dislodge the dyes from the fabric. Increased mechanical action was applied for a period of ten minutes. Thereafter, the test swatch and the ball bearings were removed from the solvent. Colorimeter tests employing a Bausch & Lomb SPEC 20 colorimeter were conducted on the solvent remaining, which serves to indicate the relative quantity of dye removed from the test swatch. The results are set forth in Table III with respect to the various solvents tested on virgin wool swatches which have been dyed red, green, yellow, blue and purple, respectively. The greater the value, the greater the degree of dye bleeding.

TABLE III

| | DYE BLEEDING | | | | |
|---|---|---|---|---|---|
| Solvent | Red | Green | Yellow | Blue | Purple |
| PM | 8 | 7 | 7 | 8 | 8 |
| PNP | 6 | 4 | 4 | 5 | 6 |
| DPM | 6 | 3 | 5 | 5 | 6 |
| Perc | 2 | 2 | 1 | 1 | 3 |
| PTB | 2 | 1 | 1 | 1 | 3 |
| DPTB | <2 | 1 | 1 | 1 | 2 |

Example 4

In similar fashion to Example 3 above, swatches of various colored acetate fabrics were tested to determine dye bleeding in the below-listed solvents. The results are set forth in Table IV below.

TABLE IV

| | DYE BLEEDING | | | | |
|---|---|---|---|---|---|
| Solvent | Red | Green | Yellow | Blue | Purple |
| PM | 9 | 8 | 9 | 9 | 8 |
| PNP | 9 | 8 | 8 | 8 | 8 |
| DPM | 8 | 8 | 8 | 9 | 8 |
| Perc | 1 | 1 | 1 | 2 | 2 |
| PTB | 2 | 1 | 1 | 2 | 2 |
| DPTB | <2 | 1 | 1 | 1 | 1 |

It is clearly evident from Tables III and IV that the azeotropic solvent of the present invention, namely, dipropylene glycol tertiary-butyl ether (DPTB), is far superior to PM, PNP and DPM, and is comparable to perc, as respects dye bleeding, whether the fabric employed is virgin wool or acetate. In point of fact, the solvent of the present invention was in each instance, regardless of fabric type or dye color, significantly more effective in preventing the bleeding of dyes when compared with the non-perc solvents.

Example 5

A stain removal test was conducted with respect to cotton by taking a series of 12"×12" test panels of cotton and applying thereto standard stain items as set forth in Table V, which were then cleaned with a perc solution containing soap. Another set of test panels similarly stained were cleaned with the DPTB composition of the present invention without soap. It will be understood by those skilled in the art that the purpose of perc is to act as a carrier for detergents, soaps, water, etc. and that most stains are typically removed by "spotting" prior to the perc dry-cleaning process. The Table V results demonstrate that the use of soaps and "spotting" is less needed with DPTB.

TABLE V

| TYPE OF STAIN | PERC W/SOAP | DPTB W/O SOAP |
|---|---|---|
| Shoe Polish | 50% | 50% |
| Lipstick | 60% | 70% |
| Face Powder | 100% | 100% |
| Ketchup | 40% | 60% |
| Salad Dressing | 70% | 80%+ |
| Animal Fat | 80% | 95% |
| Mascara | 90% | 90% |
| Mayonnaise | 90% | 90% |
| Coffee | 30% | 50% |
| Ink | 30% | 40% |
| Motor Oil | 80% | 75% |
| Syrup | 80% | 90% |

It is evident with respect to each of the stains enumerated, which are quite typically encountered by dry cleaners, that DPTB performed as well as or better than perc, which is the most prevalent solvent employed in dry cleaning today.

As will be readily appreciated, numerous variations and combinations of the features set forth within the foregoing description and examples can be utilized without departing from the present invention. The foregoing examples are intended to be illustrative only and are not to be deemed as in any way limiting the scope of the appended claims.

What is claimed is:

1. A liquid composition for dry-cleaning garments comprising dipropylene glycol tertiary-butyl ether (DPTB), water and a fabric softening agent in an amount effective to soften the fabric of garments cleaned with the dry-cleaning composition, wherein the weight ratio of DPTB to water is at least about 9:1.

2. The composition of claim 1, consisting essentially of about 90% by weight of DPTB, about 10% by weight of water, and said fabric softening agent.

3. The composition of claim 1, further comprising a second surfactant.

* * * * *